US010237118B2

(12) United States Patent
Du et al.

(10) Patent No.: US 10,237,118 B2
(45) Date of Patent: Mar. 19, 2019

(54) EFFICIENT APPLICATION BUILD/DEPLOYMENT FOR DISTRIBUTED CONTAINER CLOUD PLATFORM

(71) Applicant: SAP SE, Walldorf (DE)

(72) Inventors: Long Du, Xi'an (CN); Yu Wang, Xi'an (CN); Daping Wang, Xi'an (CN)

(73) Assignee: SAP SE, Walldorf (DE)

( * ) Notice: Subject to any disclaimer, the term of this patent is extended or adjusted under 35 U.S.C. 154(b) by 292 days.

(21) Appl. No.: 15/355,078

(22) Filed: Nov. 18, 2016

(65) Prior Publication Data

US 2018/0146069 A1    May 24, 2018

(51) Int. Cl.
*H04L 12/24*    (2006.01)
*H04L 29/08*    (2006.01)

(52) U.S. Cl.
CPC ........ *H04L 41/042* (2013.01); *H04L 67/1008* (2013.01); *H04L 67/1095* (2013.01); *H04L 67/1097* (2013.01)

(58) Field of Classification Search
CPC ............... H04L 41/042; H04L 67/1008; H04L 67/1095; H04L 67/1097
See application file for complete search history.

(56) References Cited

U.S. PATENT DOCUMENTS

| 9,465,645 | B1 | 10/2016 | Roth et al. |
| 2006/0230128 | A1 | 10/2006 | Chung et al. |
| 2009/0070792 | A1* | 3/2009 | Cable ................ G06F 9/44505 719/332 |
| 2011/0099147 | A1* | 4/2011 | McAlister ......... G06F 17/30581 707/639 |
| 2012/0089909 | A1 | 4/2012 | Block et al. |
| 2013/0332770 | A1 | 12/2013 | Thiel et al. |
| 2014/0181800 | A1* | 6/2014 | Johansson ................ G06F 8/70 717/172 |
| 2015/0046411 | A1 | 2/2015 | Kazmaier et al. |
| 2015/0052254 | A1 | 2/2015 | Zhao et al. |
| 2016/0239391 | A1 | 8/2016 | Sagiyama et al. |
| 2017/0366616 | A1 | 12/2017 | Nascimento et al. |
| 2018/0143856 | A1 | 5/2018 | Du et al. |
| 2018/0146067 | A1 | 5/2018 | Du et al. |

OTHER PUBLICATIONS

Non-Final Office Action dated Sep. 19, 2018, issued for U.S. Appl. No. 15/355,079, filed Nov. 18, 2016, 21 pages.
Suse, Automate your SAP HANA System Replication Failover, Jun. 18, 2016, suse.com (Year: 2016).

* cited by examiner

*Primary Examiner* — Quang N Nguyen
*Assistant Examiner* — Billy H Ng
(74) *Attorney, Agent, or Firm* — Klarquist Sparkman, LLP

(57) ABSTRACT

Described herein is a technology which facilitates an effective and efficient management of a data center. In one implementation, the data center includes a container cloud manager which embeds container framework, such as Docker framework to manage App images and containers of the data center. An App image is packed back to a container which starts when the App image is requested. The use of container is lightweight and starts fast, avoiding the need for installation of the App. Furthermore, the data center is a distributed management system, which includes multiple copies of an App image as well as multiple copies of the cloud container manager. This ensures continuous operation of the data center.

20 Claims, 5 Drawing Sheets

EFFICIENT APPLICATION BUILD/DEPLOYMENT FOR DISTRIBUTED CONTAINER CLOUD PLATFORM

This application incorporates by reference, for all purposes, the following patent applications: U.S. patent application Ser. No. 15/355,129 filed on Nov. 18, 2016, and U.S. patent application Ser. No. 15/355,079 filed on Nov. 18, 2016.

TECHNICAL FIELD

The present disclosure relates generally to a framework for distributed container management to facilitate customized product quick release and other services which can be built on that.

BACKGROUND

Management of a data center has become an important consideration in information technology (IT) and facility management disciplines, along with effective build and release of applications (Apps) for used by its clients. Virtual systems have been employed to facilitate building applications for a data center. However, conventional virtual systems, such as VMware, are too heavy weighted. For example, it is difficult for conventional virtual systems to support large applications, such as enterprise resource planning (ERP) applications, customer relationship management (CRM) applications or database applications, such as HANA. Furthermore, existing data centers require a build and installation of an application, for example, on bare metal, each time an application is requested. This is time inefficient.

The present disclosure provides a distributed management framework for applications in a data center which is lightweight and efficient by using containers.

SUMMARY

A technology to facilitate management of a cloud data center and build/deployment of applications in a cloud data center is described herein. In accordance with one aspect of the technology, a distributed container cloud platform is disclosed.

In one embodiment, a computer-implemented method of managing a data center is disclosed. The method includes providing a data center, in which the data center includes hosts for hosting App images and a container cloud manager for managing resources of the data center. The method also includes responding to a user presenting a new App for release to the data center, checking the App information file by the container cloud manager to determine if the new App already exists in the data center, and initiating a build of the new App if the new App does not exist in the data center. The build of the new App includes generating a new App image of the new App, configuring a container of the new App, packing the container to the new App image, creating a total of x copies of the new App image, and updating the App information file with the information of the x copies of the new App image.

In another embodiment, a non-transitory computer-readable medium having stored thereon program code is disclosed. The program code stored is executable by a computer to manage a data center. The executed management method includes providing a data center, in which the data center includes hosts for hosting App images and a container cloud manager for managing resources of the data center. The executed management method also includes responding to a user presenting a new App for release to the data center, checking the App information file by the container cloud manager to determine if the new App already exists in the data center, and initiating a build of the new App if the new App does not exist in the data center. The build of the new App includes generating a new App image of the new App, configuring a container of the new App, packing the container to the new App image, creating a total of x copies of the new App image, and updating the App information file with the information of the x copies of the new App image.

In yet another embodiment, a system for managing a data center is disclosed. The system includes hosts for hosting App images of cloud Apps and a container cloud manager for managing resources of the data center. The system for managing a data center also includes responding to a user presenting a new App for release to the data center, checking the App information file by the container cloud manager to determine if the new App already exists in the data center, and initiating a build of the new App if the new App does not exist in the data center. The build of the new App includes generating a new App image of the new App, configuring a container of the new App, packing the container to the new App image, creating a total of x copies of the new App image, and updating the App information file with the information of the x copies of the new App image.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures. Like reference numerals in the figures designate like parts.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

Figure 1:
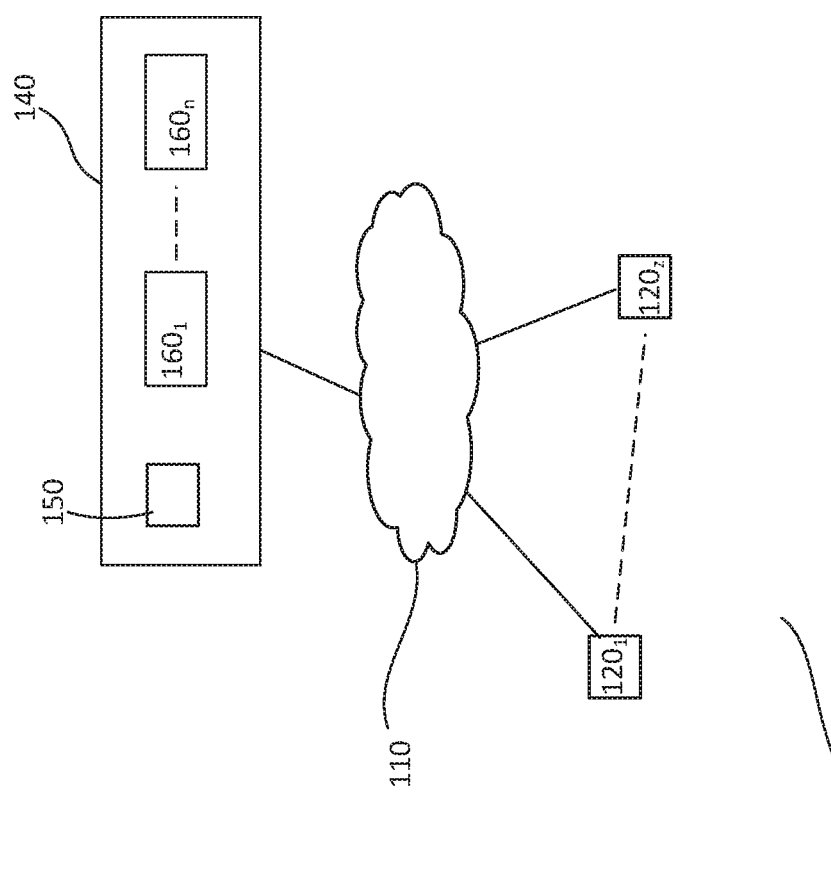
FIG. 1 shows an exemplary environment or architecture.

FIG. 1 shows a simplified diagram of an exemplary environment or architecture 100. Environment 100 may have a distributed architecture. In one implementation, the environment includes a data center 140. The data center provides various services to users. The data center and services form a cloud platform. The cloud platform, for example, may be Cloud Foundry. Other types of cloud platforms may also be useful.

The data center includes numerous interconnected servers. For example, the servers are connected through a communication network. The communication network may be an internet, an intranet, a local area network (LAN), a wide area network (WAN) or a combination thereof. Other types of connections may also be useful.

A plurality of clients, such as client $120_1$ to client $120_z$, may access the data center through a communication network 110. The value z represents the number of clients. The communication network may be an internet or a WiFi communication network. Other types of communication networks, such as an intranet or a combination of different types of communication networks may also be useful. Other techniques for communicating with the data center by the clients may also be useful. Access to the data center may require a user account and password. Other types of security measures may also be implemented.

A client may be a local or remote computing device with, for example, a local memory and a processor. The memory may include fixed and/or removable non-transitory computer-readable media, such as a magnetic computer disk, CD-ROM, or other suitable media. Various types of processing devices may serve as a client. For example, the client may be a PC, a tablet PC, a workstation, a network computer, a kiosk or a mobile computing device, such as a laptop, a tablet or a smart phone. Other types of processing devices may also be used. The client can receive, transmit, process and store any appropriate data associated with the architecture.

Clients may access the data center for various reasons. In one embodiment, clients may include developer clients and user clients. For example, developer clients develop applications (Apps) for the data center. In one embodiment, the developer clients may be developing Apps for a cloud platform or cloud foundry. As for user clients, they access the data center to utilize various available Apps. Other types of clients may also be included. For example, a front-end portion of an App, which is selected for installation, is loaded onto the client device. When invoked by the user, the back-end portion of the App runs in the data center, based on instructions by the user client. The results are presented to the user on the user device.

As for the data center, a server may be a computer which includes a memory and a processor. Various types of computers may be employed for the server. For example, the computer may be a mainframe, a workstation, as well as other types of processing devices. The memory of a computer may include any memory or database module. The memory may be volatile or non-volatile types of non-transitory computer-readable media, such as magnetic media, optical media, random access memory (RAM), read-only memory (ROM), removable media, or any other suitable local or remote memory component. A server, for example, is a host in the data center and does not include a display device. Other types and configurations of servers may also be useful.

As shown, the data center includes a container cloud manager module 150. The container cloud manager manages the resources of the data center, which includes a plurality of machines, such as machine 160 to machine 160n. The value n represents the number of machines in a data center. It is understood that in a data center, n may be a very large number. For example, n may be about in the magnitude of thousands or even more. The number n may depend on, for example, the size of the data center. Other values of n may also be useful. The value of n may be dynamic. For example, n machines may be expanded or contracted based on requirements. The container cloud manager and machines, for example, are servers. The container cloud manager serves the role of a manager while machines serve the role of workers. Other configurations of container cloud manager and machines may also be useful.

The various components of the data center, such as the container cloud manager and machines, as discussed, are interconnected. The components may be distributed over different locations. For example, the components may be distributed across different buildings. The different may be proximately distributed, for example, in a city. A building may be provided with its own back-up power source. Providing back-up power source ensures undisturbed operation of the data center during a power outage. As for components of the data center, they may be distributed into different racks in a building. Power outage to one rack or defects of a rack will not affect the operation of all other racks.

In one embodiment, the container cloud manager includes a storage master and a master database. In one embodiment, the master database may be a SAP HANA database from SAP SE. For example, the master database may include a HANA XE Engine. Other types of databases may also be useful. In one embodiment, the container cloud manager includes multiple copies or replications. For example, the container cloud manager includes an original (master), second and third replications. Providing other numbers of copies may also be useful. In one embodiment, the cloud manager involves HANA System Replication (HANA SR). The cloud container manager and replications will be subsequently discussed in greater detail.

In one embodiment, the container cloud manager is embedded with application level container framework. For example, the container cloud manager and its replications work as a container framework. In one embodiment, the container framework is a Docker framework. For example, the container cloud manager and its replications work as a Docker framework. Other types of container frameworks may also be useful. For example, container frameworks, such as LXC or Rocket container frameworks may also be useful. Docker, for example, is embedded with the master database. This enables management of containers and cloud application (App) images of the data center. As will be subsequently discussed, Apps are stored as App images in the data center and the App images are run in the containers. The cloud container manager, in one embodiment, employs container service, such as Docker service, to manage containers and App images of the data center. Other types of container services may also useful. In one embodiment, Docker is embedded with HANA SR master database, enabling management of containers and App images of the data center.

The framework, including cloud container manager, containers and App images serves as a cloud platform. For example, the cloud platform offers container service to customers. The container service in the cloud platform may be referred to as a container cloud. The container cloud may be a cloud foundry. As for the machines, they are hosts which serve as the resources for the data center. The cloud container manager manages the resources of the data center. For example, the machines are employed to build, package and deploy cloud Apps.

The container framework, such as Docker framework, may be a tool, an infrastructure or an architecture used to build, deploy and run Apps using containers. In one embodiment, the Docker framework, like swarm, mesos or kubernates, is well designed for Docker management. For example, the Docker framework supports various management functions, such as resource scheduling, load balance, disaster recovery and elastic scaling of the data center as well as other management functions. In one embodiment, the cloud container manager embedded with the container framework supports "one-build, run-everywhere" concept or function. In "one-build, run-everywhere", a customized App needs only to be built once. For example, a new App is built if it does not already exist in the data center. This is the one-build part of the "one-build, run-everywhere" function. Once the new App is built, its App image is stored in the data center. Subsequently, when a user searches the App, the user can find the App image and do whatever the user desires. In other words, the App can run everywhere. For example, this is the run-everywhere part of the "one-build, run-everywhere" function.

In one embodiment, the one-build function is supported by a build tool. In one embodiment, the build tool is a Jenkins build tool. Other types of build tools may also be useful. The build tool, for example, is a stand-alone tool. The build tool may run on any data center servers. A build is performed when a new App is released. For example, when a new App is delivered, it triggers the build tool to perform a new build using Docker. In one embodiment, the storage master searches the master database to see if the App already exists in the data center. If it doesn't, it triggers the build tool to initiate a build. For example, the container build is in the Jenkins build process. The container cloud manager maintains information of machines in the data center. For example, machines which support Docker are maintained in the master database. The container cloud manager selects a machine which supports Docker to build the App. The storage master and master database work together as the Docker framework. For example, the storage master and HANA SR of the container cloud manager work as the Docker framework.

The build includes generating an image of the App. A container is also built as part of the build process. The container, for example, is the runtime of the App image. The App image includes container configurations. For example, the container is configured with necessary dependencies and functions, and packed back to the App image. In one embodiment, the App image includes configurations for a Docker container. The framework may also support other types of containers. For example, App image may include configurations for other types of containers, such as LXC or Rocket. The container runs when the App is started. For example, the container starts based on the App image. The container isolates the App from the host and ensures that the App will run on any machines of the data center, regardless of any customized settings.

After the build is completed, information of the App image is registered with the master database of the container cloud manager. In one embodiment, information of the x copies of the App image is registered in the master database, such as HANA master database. In one embodiment, 3 copies of the App image are stored in the data center (e.g., x=3). Other values of x may also be useful. Excess copies greater than x are deleted from the data center. Each copy of the App image is stored in a different host of the data center. Such information may include App image information, including name, version, and host location where the images are stored. The App image is stored in the data center. Once the App exists in the data center, no additional build is performed. As such, only one build is needed for the App.

In one embodiment, as described, when a new App is released, a new container is created. For example, a new App release involves creating a new App image and a new container. The container is configured and packed back to the App image. Intermediate container or containers are deleted, leaving the App image. The container cloud manager encapsulates container service, such as Docker service. Other types of container services may also useful. For example, the Docker command interface is encapsulated as a library for further development. Encapsulating or embedding Docker service enables transparent operation by the user, such as using Linux command line directly. Also, Docker service supports some container changes or modifications. Such changes include, for example, specifying which host runs the App, SSH configuration and batch operation on Docker. Other types of changes or modifications may also be useful. Encapsulation of Docker services is achieved using library interfaces. The library interfaces can be used in various conditions. This enables further development. For example, a user, such as a developer, can use the library to build additional images or containers. Other types of users may also utilize the library interfaces. The user can employ the library interfaces as part of App development, App testing and App release as well as other purposes.

In one embodiment, "run-everywhere" is effected by containers. As discussed, a container is a runtime of the App image. When an App is started, the container starts. The container isolates the App from the host and ensures that the App will run on any machine of the data center, regardless of any customized settings. As such, the image can run on any machine in the data center. The App can run on other machines as well, such as those outside of the data center.

In one embodiment, the framework employs a distributed Docker infrastructure for the data center. The distributed Docker infrastructure, as discussed, includes multiple container cloud managers. For example, the distributed Docker infrastructure includes multiple servers serving as container cloud managers. Each of the container cloud managers is synchronized. For example, the container cloud managers contain identical information stored in the database after synchronization. In one embodiment, HANA SR performs the synchronization function. Other techniques for synchronizing the container managers may also be useful.

In one embodiment, the multiple copies of the data master manger should be strategically located to increase the probability that at least one copy of the container cloud manager is running. For example, the multiple copies of the container cloud manager are strategically located to minimize the likelihood that all the copies of the container cloud managers are down. The container cloud managers may be strategically located in different racks, different buildings and different parts of the city. For example, at least one container cloud manager is located in a different part of the city so as not to be affected by local power outages, or local or regional disasters. The locations may be selected to avoid all multiple copies to be simultaneously down. The information of the container cloud manager and its copies is configured when the environment is created.

The framework, as discussed, includes y container cloud managers. In one embodiment, the framework includes 3 container cloud managers (y=3). Providing other values of y may also be useful. For example, the numbers of container cloud managers may be greater or less than 3. The greater the number, the greater the assurance that the data center will be operable. Providing 3 container cloud managers have been found to provide a high level of assurance of maintaining data center operable. This is because it is very unlikely of a case where two container cloud managers are simultaneously unavailable. And even so, there is the third copy available.

In one embodiment, the first container cloud manager may be referred to as the master container cloud manager, the second container cloud manager is a second replication container cloud manager, and the third container cloud manager is a third replication container cloud manager. The master is configured to manage the data center. If the master is down, the second replication takes over managing the data center. For example, the second replication becomes the new master and the old master becomes the new second replication. While the new master is managing the data center, the third replication restores the new second replication to its current state. In the case that both the master and second replication are down, the third replication restores the master to its current state prior to being down. Then the master manages the data center while the third replication restores the second replication. Other configurations of restoring container cloud managers may also be useful.

In one embodiment, to further enhance the distributed architecture of the data center, an App image includes multiple copies of the App image, as discussed. For example, each App image includes x multiple copies of the App image. The copies of the App images are strategically stored so that at least one copy is always available. For example, the copies of the App image are stored in different machines of hosts in the data center. Preferably, the different hosts are not on the same node. Providing copies in hosts on different nodes avoids the situation of unavailable copies of the App image from a single node fault. For example, the hosts may be on different racks, different rooms, or different buildings. Other configurations of storing the copies may also be useful. The information of the Apps and their copies is maintained in the master database. For example, the information may be maintained in an App table in the master database, such as HANA master database. The App table contains all Apps in the data center.

In one embodiment, the framework includes 3 copies of an App image (x=3). Providing other values of x may also be useful. For example, the number of x copies may be greater or less than 3. The greater the number, the greater the assurance that an App image is available. However, this is at the cost of increased servers and machines. Providing 3 copies results in a high level of assurance of at least one of the App image copies is available. This is because it is very unlikely of a case where 3 copies are simultaneously unavailable. Excess copies are removed from the data center. Furthermore, it is understood that the number of cloud container masters y and the number of App image copies x can be different (e.g., x≠y).

As discussed, the container cloud manager supports management functions, such as resource scheduling, load balance, disaster recovery and elastic scaling of the data center, as well as other management functions. The container cloud manager leverages the data center's networking, memory, and CPU usage resources for hosts load balance. For example, the data center manger determines which host to utilize for the build and storage of the new App images, including copies. In addition, the proposed container cloud manager with embedded Docker service for container service can easily be integrated into the existing infrastructure or be offered as the cloud service independently. The proposed framework can be a stand-alone framework or integrated with existing infrastructure.

Figure 2:
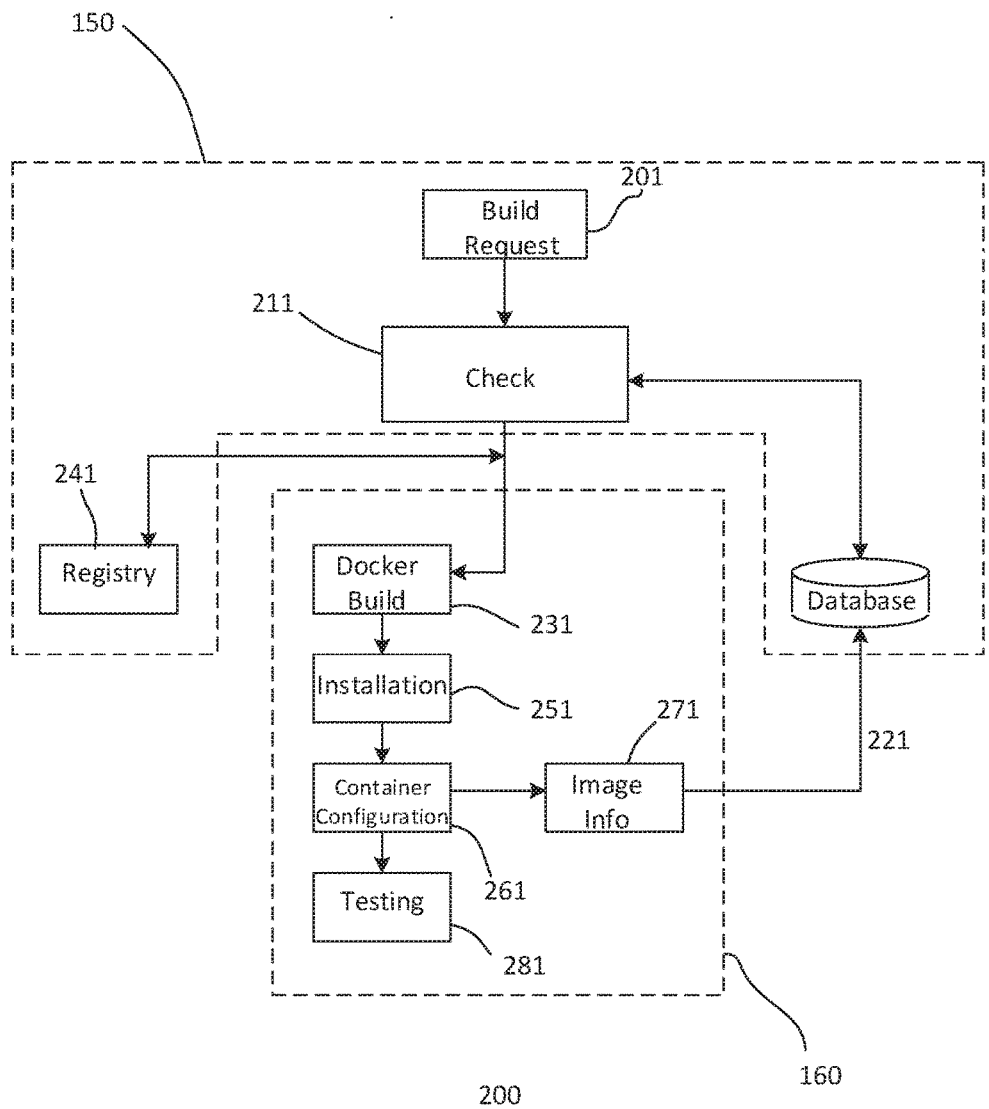
FIG. 2 shows a simplified workflow of a cloud data center.

FIG. 2 shows an embodiment of a build process 200 in the data center. The various procedures of the build process are performed by different components of the data center. For example, procedures for the build process may be performed by container cloud manager 150 or hosts 160, as indicated by the dotted lines. In one embodiment, a developer user delivers a new App for release.

A build request procedure 201 is initiated by the container cloud manager. For example, the build request is initiated by the storage master. In one embodiment, the storage master initiates a build request in response to the developer user providing a new App for release. In one embodiment, the container cloud manager performs a check procedure 211 by the storage master to determine if an image of the new App is already in the data center. For example, the storage master checks the master database to ensure that no image of the new App is currently in the data center. This may include searching through the table in the storage database containing information of all the Apps of the data center.

In the case that an image of the new App already exists in the data center, the container cloud manager returns an error message to the developer user and terminates the build process. For example, the storage master returns the error message to the user. This ensures one build function of the framework. In some cases, the error message may include details of the image of the new App in the data center. The developer user may then check further to correct any errors, if necessary.

In the case that no image of the new App exists in the data center, the build proceeds. For example, the build process proceeds to perform a build procedure by invoking a build tool. The build tool, in one embodiment, is a Jenkins build tool. Other types of build tools may also be useful. The build tool performs a build using Docker service. For example, the data center master selects a host 160 to perform the build.

The cloud container manager includes a registry which contains a list of hosts capable of performing the build. For example, the registry is contained in the master database. A host which is capable of performing the build process includes, for example, an original container service image, such as Docker image, in its internal repository. For example, the original Docker image is an operating system image provided by Docker, such as SUSE, redhat, Ubuntu or other types of operating system image from Docker. For example, the storage master performs a registry check procedure 241. From the list of hosts in the registry which support Docker, the storage master determines the host to elect, based on the information in the master database and resource utilization of the data center. For example, hosts with greater available resources, such as RAM, CPU, and internal storage, may be selected. The container cloud manager, as discussed, is used to facilitate the host selection process.

The selected host performs the build. For example, Docker image is retrieved from the internal repository of the selected hosts. An installation procedure 251 is performed to install the Docker image in the selected host. The build tool, such as Jenkins build tool, initiates the build process. For example, the Docker build is in the Jenkins build process. The build generates an App image. A container, which is the runtime of the App image, is also built as part of the build process. The container may be a Docker container. Other types of containers, such as LXC or Rocket, may also be useful.

A configuration procedure 261 is performed on the container. For example, the developer user configures the container with necessary dependencies and functions, and packed back to the App image. For example, the operation/configuration is packed in the App image. The container runs when the App is started. For example, the container starts based on the App image. The container isolates the App from the host and ensures that the App will run on any machines of the data center, regardless of any customized settings. After configuring the container, the configured container is deleted, leaving the App image. For example, intermediate container or containers generated during the build process are deleted. The completed build process results in the App image.

In one embodiment, the build process generates x multiple copies of the App image. In one embodiment, the framework includes 3 copies of an App image (x=3). Generating other number of copies may also be useful. The copies of the App image are stored in different hosts in the data center. In one embodiment, an image information procedure 271 is performed to generate image information. Image information includes, for example, name, version, copy, and host location where the images are stored.

In one embodiment, the container cloud manager automatically selects hosts for storing the copies of the App image. The host selection may be based on disk resource load balance. For example, the 3 hosts with the most disk space available are selected. In addition, the host selection may take into account of selecting hosts on different nodes of the data center to avoid unavailability of all or multiple copies from a single node fault. For example, the hosts may be on different racks, different rooms, or different buildings. Other configurations of storing the copies may also be useful. For example, the developer user may select the hosts which the copies of the App image are stored.

An information registration procedure 221 is performed to update the image information in the master database. For example, image information of the copies of the built App image is registered in the master database, such as HANA SR. For example, the image information of the copies of the built App image is updated in the table in the master database which contains image information of all Apps of the data center.

A test procedure 281 may be performed. The test procedure, for example, may be performed by the developer user to validate the App. The test procedure, for example, is part of the normal development flow. After validation, the newly build App is released. In some cases, the developer user may maintain a pervious or older version of an App image for reference. An older version of an App image may be removed if it has not used for a specified length of time or based on time to live (TTL).

As discussed, when an App image is requested, the container starts. For example, the container, which is the runtime of the App image, starts. The container's information is registered on the container cloud manager. For example, the container's information is registered on the master database. The host in which the container starts is selected by the storage master. For example, the storage master selects the host based on CPU, memory and disk load balance. After use, the container will be deleted. The relevant registered information of the container in the master database will also be deleted.

Figure 3:
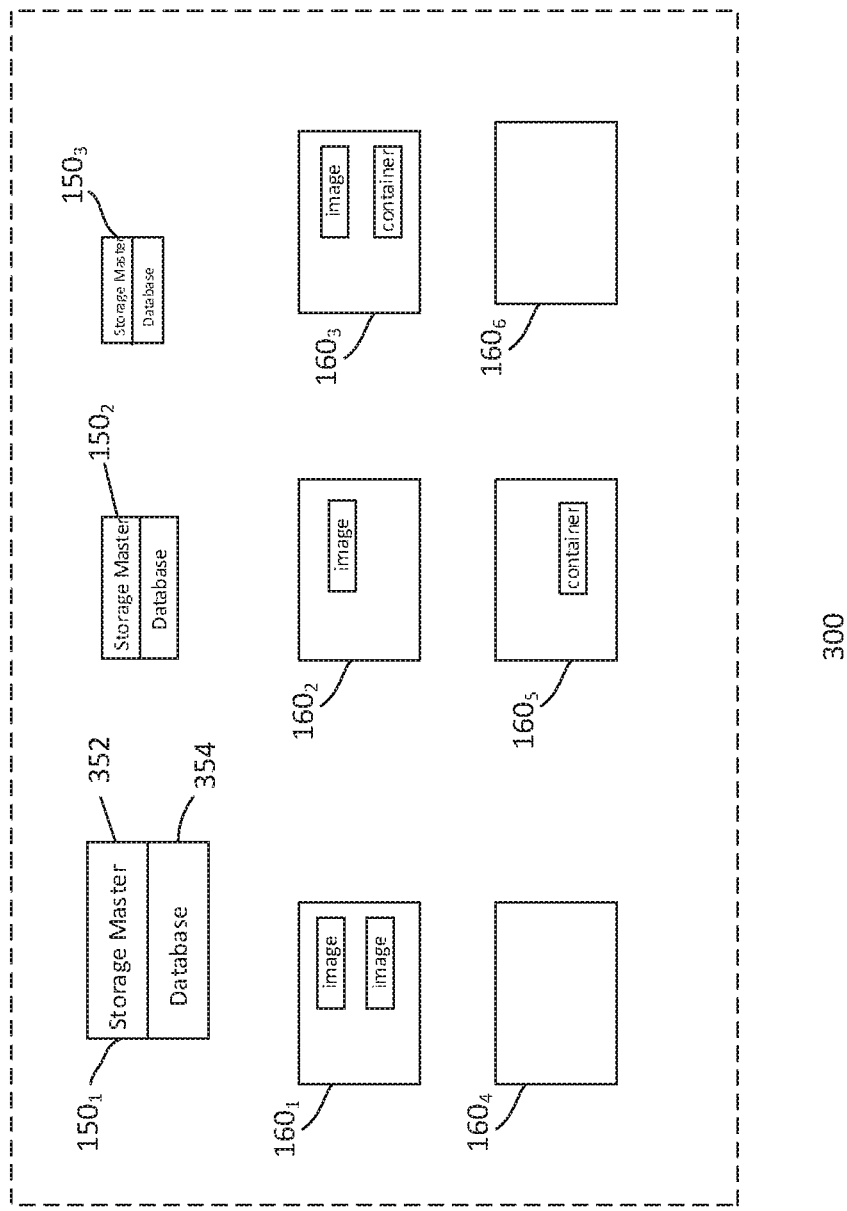
FIG. 3 shows a simplified architecture of a cloud data center.

FIG. 3 shows a simplified distributed App image and container management architecture 300 of a data center. The distributed management architecture includes y multiple container cloud managers, such as container cloud managers $150_{1-y}$. In one embodiment, y=3. For example, the distributed management architecture includes container cloud managers $150_1$, $150_2$ and $150_3$. Providing other numbers of container cloud managers may also be useful. In one embodiment, the first container cloud manager $150_1$ may be referred to as the master while the second and third container cloud managers may be referred to as the second and third replications.

The storage master may be bundled with the master database. In one embodiment, the storage mater is bundled with HANA SR. For example, the storage master and HANA work as the container cloud manager to manage containers, such as Docker and/or other types of containers. This enables high availability due to the master and first and second replications. The master and the second replication are connected using a synchronization mode connection. For example, all information from the master is updated and maintained in master database of the second replication. The second replication and the third replication are connected using an asynchronous mode of connection. For example, information from the second replication may not be immediately updated in the master database of the third replication.

As also shown, the data center includes n plurality of hosts 160. Illustratively, only six hosts $160_1$ to $160_6$ are shown for simplicity. However, it is understood that the data center includes a large number of hosts. Also, as already discussed, the hosts may be distributed and need not be located in the same location.

The container cloud manager manages the resources of the data center. In one embodiment, the first or master container cloud manger may be the primary container cloud manager. For example, the master container cloud manager is used. In the event the master container cloud manager is down, responsibility of data center management transfers to the second storage manager. For example, the second container cloud manager serves as a backup for the master container cloud manager. The second replication effective becomes the new master while the old master becomes the new second replication. This enables the restoration of the old master container cloud manager without interruption operation.

In the event that both the first and second container cloud managers are down, the third container cloud manager serves as a disaster recovery system. For example, disaster recovery is performed to bring the first and second data managers back on-line. In one embodiment, data from the third container cloud manager is used to restore the first or second container cloud manager to its previous state. Once the first container cloud manager is back on-line, the other cloud manager may be restored. The first data center manager takes over the control of the data center once it is on-line and the second container cloud manager serves as the backup. Other configurations of providing backup in the case of one of the container cloud managers is down may also be useful.

In one embodiment, the storage master can access all hosts of the data center. The storage master accesses the hosts by, for example, using a user and password which is maintained in the master database. When a new build requests is initiated, the storage master requests host resource utilization information and selects a host which can support and perform the build. For example, the master database includes a list of hosts which support Docker build. The storage master, from the list, selects the host with the most resources available. For example, the host with the biggest memory, biggest disk size and most number of CPUs is selected. The build generates, in one embodiment, 3 copies of an App image. Generating other number of copies of an App image may also be useful. As already discussed, an App image includes a container packed backed to it.

In one embodiment, the distributed architecture of the data center includes storing copies of the App image strategically in different hosts to increase the probability that at least one copy is available for use by clients. In one embodiment, the container cloud manager automatically selects hosts for storing the copies of the App image. The host selection may be based on disk resource load balance. In addition, the host selection may take into account of selecting hosts on different nodes of the data center to avoid unavailability of all or multiple copies from a single node fault. For example, the hosts may be on different racks, different rooms, or different buildings. Other configurations of storing the copies may also be useful. For example, the developer user may select the hosts which the copies of the App image are stored.

As shown, copies of App images are distributed on different hosts of the data center. As for copies of different App images, they may occupy the same host. The information of all copies of all App images of the data center is maintained in the master database. For example, the information may be maintained in an App table in the master database.

As discussed, when an App image is requested, the container starts. For example, the container, which is the runtime of the App image, starts. The container's information is registered on the container cloud manager. For example, the container's information is registered on the master database. The host in which the container starts is selected by the storage master. For example, the storage master selects the host based on CPU, memory and disk load balance. After use, the container will be deleted. The relevant registered information of the container in the master database will also be deleted.

In one embodiment, the number of data center masters and the number of App copies in the data center is 3. Providing other numbers of data center masters and copies of Apps in the data center may also be useful. For example, the number of data center masters and App copies may be greater or less than 3. The greater the number, the greater the assurance that the data center will be operable and Apps are available. However, this is at the cost of increased servers and machines. Providing 3 data center masters and 3 App copies provide a high level of assurance of maintain data center operable. This is because it is very unlikely of a case where two data center masters of App copies are simultaneously unavailable. And even so, there is the third copy available. Furthermore, it is understood that the number of data center masters and App copies can be different.

In one embodiment, excess copies of App images and containers are removed from the data center. In addition, the App images and containers may be set with time to live (TTL). Removing excess copies and the use of TTL serves to prevent storage growth from being out of control.

Figure 4:
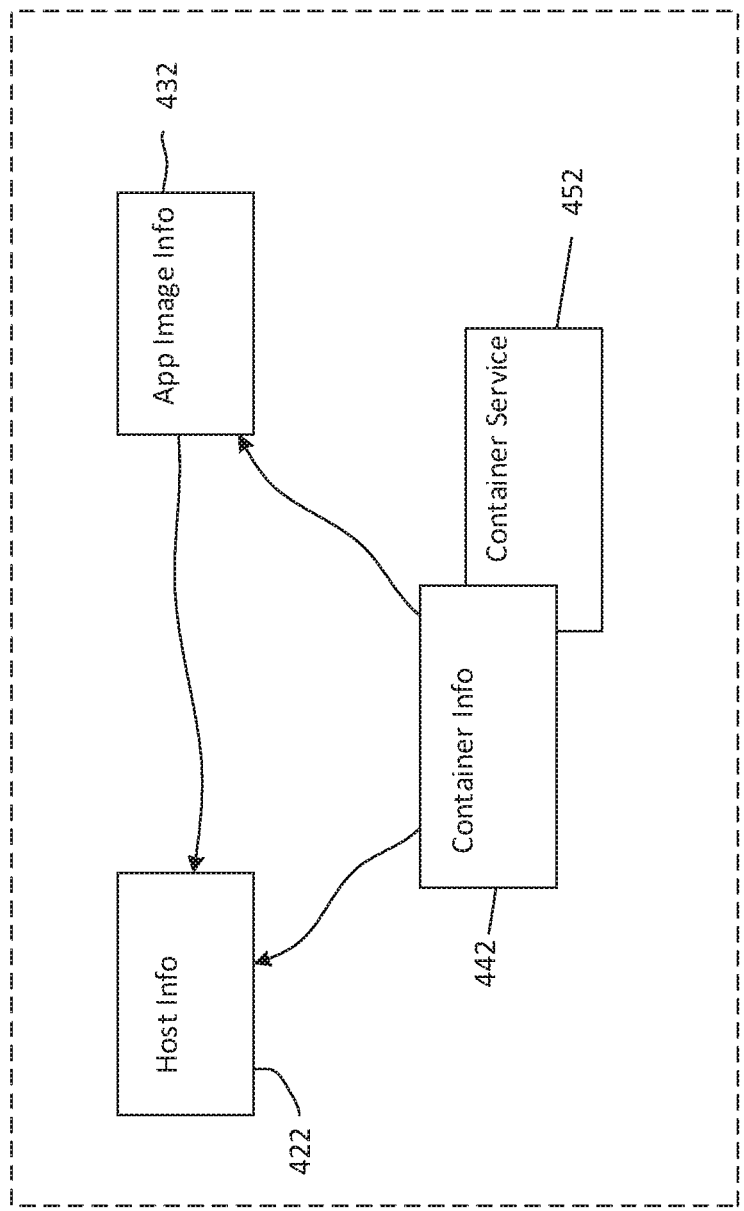
FIG. 4 shows an embodiment of a master database storage.

FIG. 4 shows an embodiment of data center information 354 which is maintained by the container cloud manager. The information, in one embodiment, is stored in the master database 354 of the container cloud manager. For example, the information may be stored as table or tables. In one embodiment, the master database maintains host information 422, App image information 432, and container information 442. The different information may be stored in separate data tables. In addition, the information is contained in different copies of container cloud masters. The information is synchronized with different container cloud masters. Other configurations of storing the information may also be useful.

Host information, for example, includes information as provided in Table 1 below:

TABLE 1

| Field Name | Description |
| --- | --- |
| hostname | Name of the host machine |
| user | User name of the user account for container cloud manager to access the host machine |
| password | Password of the user account for the container cloud manager to access the host machine |
| IP | IP address of the host machine |
| CPU | CPU power of the host machine |
| memory | RAM capacity of the host machine |
| Disk | Internal storage capacity of the host machine |

Providing other types of host information may also be useful.

App image information, for example, includes information as provided in Table 2 below:

TABLE 2

| Field Name | Description |
| --- | --- |
| imageID | ID of the App image |
| buildversion | Version of the App image |
| copy1location | Host location of the first copy in the data center |
| copy2location | Host location of the second copy in the data center |
| copy3location | Host location of the third copy in the data center |
| createtime | Time stamp when the App image was generated |
| TTL | Time to live for the App image |
| remarks | Comments |

Providing other types of App image information may also be useful.

Container information, for example, includes information as provided in Table 3 below:

TABLE 3

| Field Name | Description |
| --- | --- |
| location | Host location of the container |
| imageID | ID of the App image which the container is packed to |
| createtime | Time stamp when the container was generated |
| modified | Whether the container has a modified version and points to the modified version |
| TTL | Time to live of the container |
| remarks | Comments |

Providing other types of App image information may also be useful.

In one embodiment, container service information 452 is associated with the container. For example, the container service is a Docker command abstracted interface, which is a supported Docker service. Container service information, for example, includes services of the container. Such services may include SSH free pass, batch job as well as other types of container services. Other types of information of the data center may also be maintained in the master database.

Figure 5:
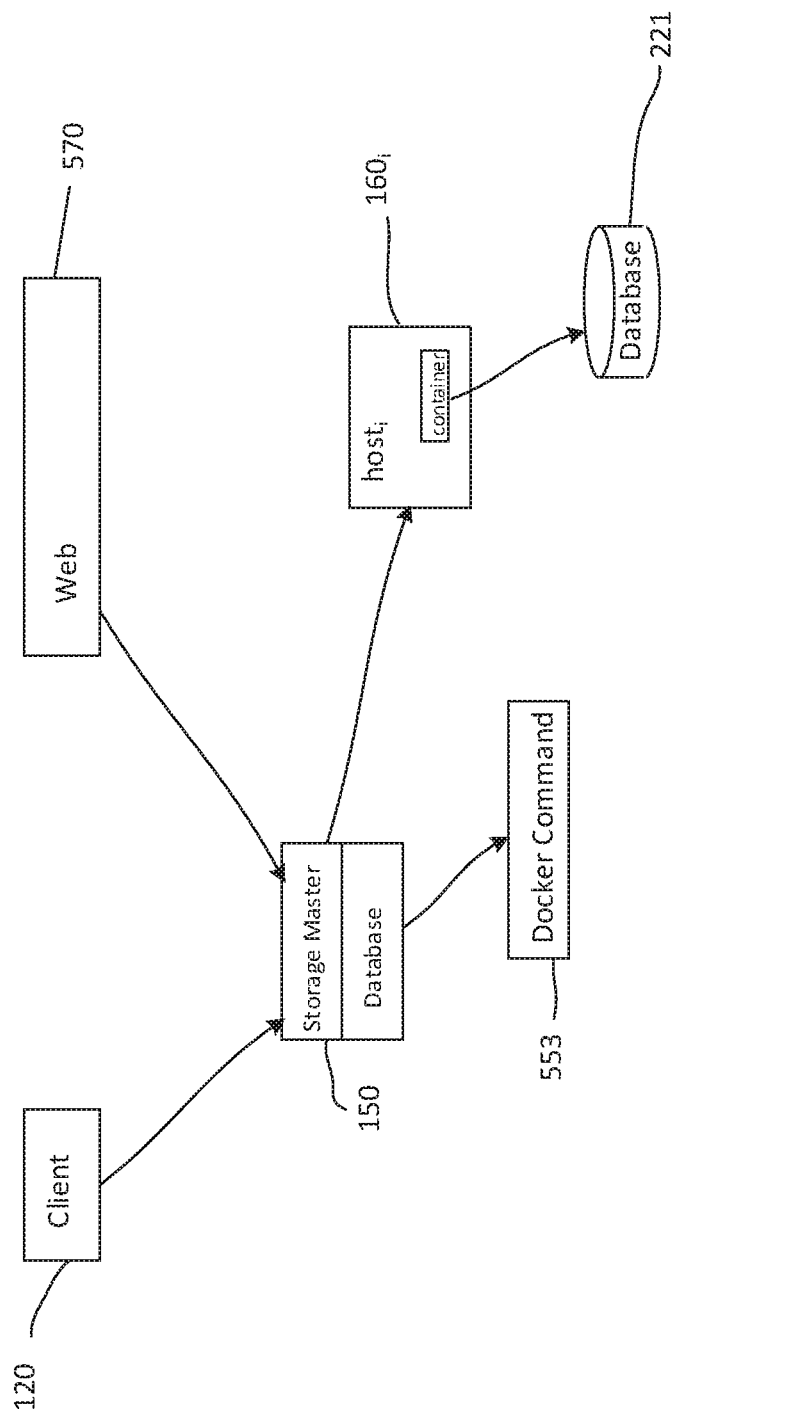
FIG. 5 shows an embodiment of Docker service encapsulation in a cloud data center.

FIG. 5 illustrates an example of encapsulating of container service 500, such as Docker service, to users. A client 120 may access the data center through the storage master 150. The client may access the data center through client mode or web access mode. For example, in the client mode, the client accesses the data center directly using, for example, a client application. On the other hand, in the web access mode, the client accesses the data center through the Web 570. For example, the client may access the data center through a web browser or interface, such as Chrome, Internet Explorer, Safari or Firefox.

In one embodiment, frequently used container configurations, such as Docker configurations, as well as master database in Docker changes are abstracted to interfaces. For example, users can choose the interface as a service to simplify container usage. For example, Docker commands 553 are wrapped to help users, such as developer users, to use Docker service, like in direct Linux command line. Other types of users may also be useful. Frequently used Docker commands by users may include specifying hosts to run, SSH configuration, batch job as well as other commands.

As discussed, the present framework utilizes lightweight container technology to efficiently build and deploy applications as App images. An App image includes a container packed back to it. As an example, a build of a HANA database application using the present framework will take about 5-6 minutes. For example, the HANA App image with container packed back to it will take about 5-6 minutes. The size of the HANA App image is about 12-14 gigabytes. Given that a data center typically has a data transfer rate of about 1000 megabytes per second (MB/s), the transfer of the HANA App image to its target host will take about 13 seconds. Starting the container from the HANA App image takes about 5 seconds. This results in a total of 18 seconds for HANA App image to run after the build. For smaller Apps, starting a container from the App image takes only about 1 second. Clearly, the present framework results in significant time savings compared to conventional builds and installations on bare metal, which can take hours, especially for large Apps, such as HANA and other ERP Apps. Furthermore, bare metal requires a build each time it is used. On the other hand, the present framework only requires one build.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method of managing a data center comprising:
  providing a data center having
    z number of hosts for hosting application ("App") images of cloud Apps, where z is a number suitable for a data center, wherein:
      each cloud App includes x copies of a respective App image, where x is greater than 1,
      an App image is packed back to a container which starts when the App image is requested, and
    a container cloud manager for managing resources of the data center, wherein managing resources of the data center comprises an App information file containing information of copies of App images of the cloud Apps of the data center; and
  in response to a user presenting a new App for release to the data center, the container cloud manager checks the App information file to determine if the new App already exists in the data center,
    if the new App does not exist in the data center, the container cloud manager initiates a build of the new App, wherein the build comprises:
      generating a new App image of the new App,
      configuring a container of the new App,
      packing the container of the new App to the new App image,
      wherein the container of the new App starts when the new App image is requested,
      creating a total of x copies of the new App image, and
      updating the App information file with the information of the x copies of the new App image.

2. The method of claim 1 wherein the container cloud manager comprises:
  a storage master; and
  a master database, wherein the master database contains the App information file.

3. The method of claim 2 wherein the master database further comprises information of hosts of the data center.

4. The method of claim 2 wherein the master database comprises a HANA database.

5. The method of claim 4 wherein the master database comprises container information of a started container of the requested App image, the started container starts on a selected container host of the data center when the requested App image is requested.

6. The method of claim 5 wherein the storage master selects the container host based on memory and CPU load balance of the hosts of the data center.

7. The method of claim 1 wherein the container cloud manager comprises y copies of the container cloud manager.

8. The method of claim 7 wherein the container cloud manager involves HANA System Replication.

9. The method of claim 7 wherein x=3 and y=3.

10. The method of claim 1 wherein x copies of the App image are located in x different hosts of the data center.

11. The method of claim 10 wherein the container cloud manager selects the different hosts for storing x copies of the App image based on storage load balance.

12. The method of claim 1 wherein management of the data center comprises a distributed management framework.

13. A non-transitory computer-readable medium having stored thereon program code, the program code executable by a computer to manage a data center comprising:
  providing a data center having:
    z number of hosts for hosting application ("App") images of cloud Apps, where z is a number suitable for a data center, wherein:
      each cloud App includes x copies of a respective App image, where x is greater than 1, and
      an App image is packed back to a container which starts when the App image is requested, and
    a container cloud manager for managing resources of the data center, the container cloud manager comprises:
      a storage master,
      a master database, wherein the master database comprises an App information file containing information of copies of App images of the cloud Apps of the data center; and
  in response to a user presenting a new App for release to the data center, the container cloud manager checks the App information file to determine if the new App already exists in the data center, if the new App does not exist in the data center, the container cloud manager initiates a build of the new App, wherein the build comprises:
generating a new App image of the new App,
configuring a container of the new App,
packing the container of the new App to the new App image, wherein the container of the new App starts when the new App image is requested,
creating a total of x copies of the new App image, and
updating the App information file with the information of the x copies of the new App image.

14. The non-transitory computer-readable medium of claim 13 wherein the container cloud manager is embedded with a container framework.

15. The non-transitory computer-readable medium of claim 14 wherein the container framework comprises a Docker framework.

16. The non-transitory computer-readable medium of claim 13 wherein the container cloud manager comprises y copies of the container cloud manager.

17. A system for managing a data center comprising:
z number of hosts for hosting application ("App") images of cloud Apps, hosts of the z number of hosts comprising memory and one or more processors, wherein:
each cloud App includes x copies of respective App image, where x is greater than 1, and
an App image is packed back to a container which starts when the App image is requested,
a container cloud manager for managing resources of the data center, wherein managing resources of the data center comprises an App information file containing information of copies of App images of the cloud Apps of the data center; and
wherein the container cloud manager, in response to a user presenting a new App for release to the data center, the container cloud manager checks the App information file to determine if the new App already exists in the data center,
if the new App does not exist in the data center, the container cloud manager initiates a build of the new App by a selected host in the data center selected by the container cloud manager from hosts capable of performing the build, wherein the build comprises:
generating a new App image of the new App,
configuring a container of the new App,
packing the container of the new App to the new App image, wherein the container of the new App starts when the new App image is requested,
creating a total of x copies of the new App image, and
updating the App information file with the information of the x copies of the new App image.

18. The system of claim 17 wherein the container cloud manager is embedded with a container framework.

19. The system of claim 17 wherein the container cloud manager comprises:
a storage master;
a master database; and
wherein the storage master and the master database work as a container framework.

20. The system of claim 19 wherein the container framework comprises a Docker framework.

* * * * *